March 5, 1929.    C. H. SNIDER    1,704,634

STRAINER

Filed Nov. 27, 1925

Charles H. Snider,
INVENTOR

BY Victor J. Evans
ATTORNEY

WITNESS:

Patented Mar. 5, 1929.

1,704,634

UNITED STATES PATENT OFFICE.

CHARLES H. SNIDER, OF CONWAY, SOUTH CAROLINA.

STRAINER.

Application filed November 27, 1925. Serial No. 71,726.

This invention relates to improvements in screens especially adapted for use in connection with water or other liquid supply systems, wherein meters or like measuring devices are used, an object being to strain the liquid before it enters the meter or device so as to insure more accurate operation.

Another object of the invention is the provision of a strainer of novel construction which will insure a greater flow of liquid for a given diameter of pipe than is possible with the ordinary washer type of strainer.

Another object of the invention is the provision of a strainer which may be flushed for the removal of extraneous matter without removing the strainer or detaching the sections of the pipe line in which the strainer is included.

With the above and other objects in view, the invention further includes the following novel features and details of construction, to be hereinafter more fully described, illustrated in the accompanying drawings and pointed out in the appended claim.

In the drawings:—

Figure 1:
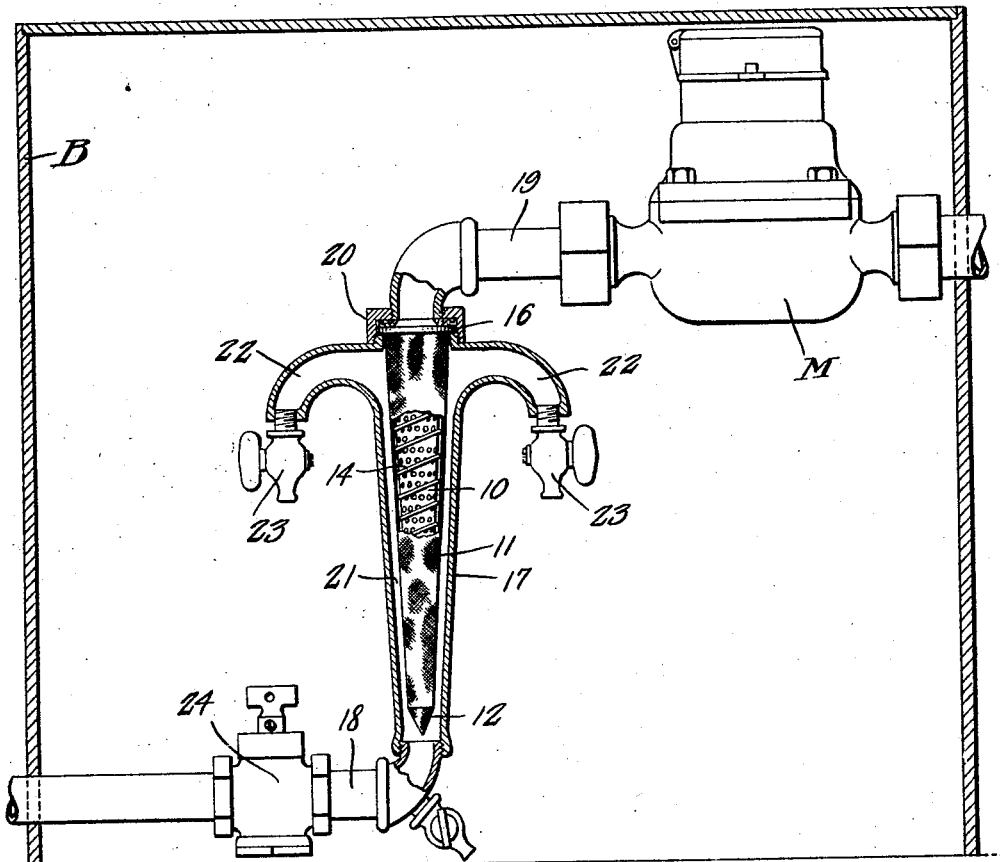
Figure 1 is a view showing the invention applied, the strainer housing being shown in section and the strainer partly broken away.
Figure 2:
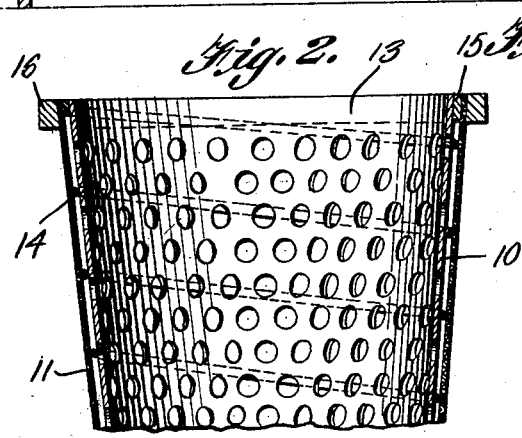
Figure 2 is an enlarged fragmentary section taken longitudinally at one end of the strainer.
Figure 3:
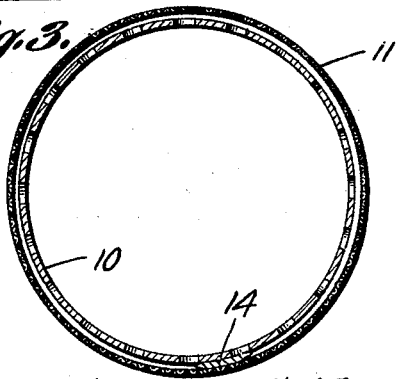
Figure 3 is a transverse section.

Referring to the drawings in detail wherein like characters of reference denote corresponding parts, the strainer illustrated in Figures 1, 2 and 3 of the drawings comprises an inner form sustaining section 10 and an outer section 11, both of which are substantially conical in form so as to taper from the smaller or restricted closed end 12 of the strainer to the opposite open end 13.

The inner section 10 is preferably formed of thin, relatively stiff sheet metal perforated to provide an inner foraminous wall, while the outer section 11 is of relatively fine screen. The sections 10 and 11 are spaced apart by spirally arranged wire 14 which extends from one end to the other end of the strainer. By spacing the sections 10 and 11 apart in this manner an increased straining surface is provided. The sections 10 and 11 are spaced apart at their open ends by a ring or collar 15, while an additional ring or collar 16 which surrounds the outer section provides an annular flange. The sections 10 and 11 and the wire spacer 14 are preferably formed of copper or other non-corrosive material.

When used in connection with a water meter indicated at M in Figure 1 of the drawings, the meter and strainer are preferably arranged within a meter box B. For this purpose there is provided a strainer housing 17 which includes an elongated tapered portion having one of its ends secured to the inner end of a supply pipe 18, while the opposite end of the housing is connected by means of a short pipe section 19 with the meter M. This last mentioned connection is effected by a collar or union 20 which is threadedly secured to the adjacent end of the screen housing and the ring or annular flange 16 of the strainer rests upon the end of the housing 17 and is clamped in place by the coupling 20. The space between the strainer and the inner wall of the housing 17 provides a sediment collecting chamber 21.

Extending from and communicating with the chamber 21 are oppositely and outwardly disposed pipes 22 which are provided at their outer ends with cocks 23. A valve or cock 24 is arranged within the pipe 18 so as to control the flow of water through the screen to the meter.

It will be seen that water before it enters the meter must pass through the screen within the housing 17 and due to the large amount of screening surface, considerable sediment or other extraneous matter may collect within the chamber 21 before the flow of water into the meter is materially interfered with. The amount of sediment within the chamber 21 may be determined by the amount of water passing through the meter and when it is desired to remove this sediment and clean the screen, the cocks 23 are opened. The chamber 21 will thus be flushed out, the provision of more than one outlet pipe 22 insuring a greater water disturbance and thereby more effectually removing sediment from the chamber 21 and sediment which will have collected within the pipes 22.

The invention is susceptible of various changes in its form, proportions and minor details of construction and the right is herein reserved to make such changes as properly fall within the scope of the appended claim.

Having described the invention what is claimed is:—

A strainer of the character described including an inner hollow substantially conical member closed at one end and provided with perforations, an outer relatively fine foraminous section of similar contour, a wire arranged spirally between the sections to space the latter apart, a ring surrounding the open end of the inner section to assist in holding the sections spaced apart, a second ring surrounding the outer section adjacent its open end, a substantially conical shaped housing with the strainer, and said second mentioned ring reposing upon the upper end of the housing to support the strainer within the latter and spaced from the walls thereof.

In testimony whereof I affix my signature.

CHARLES H. SNIDER.